Nov. 22, 1927. 1,649,808
C. C. CADDEN ET AL
METHOD AND APPARATUS FOR MAKING TUBULAR ARTICLES
Filed March 11, 1924 2 Sheets-Sheet 2
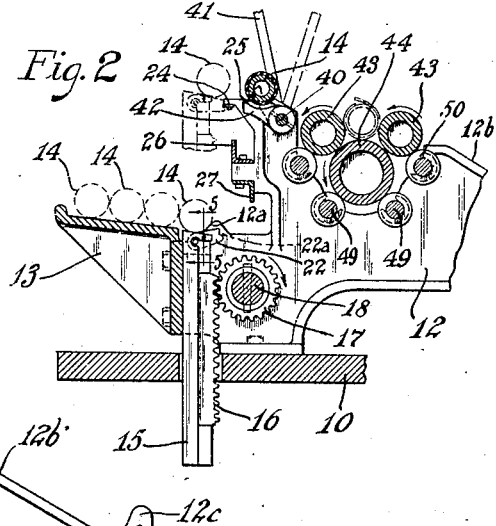
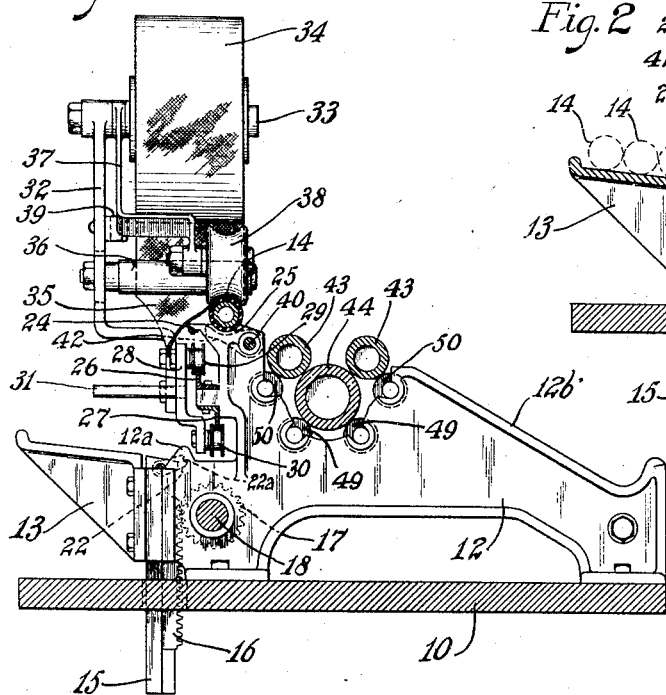
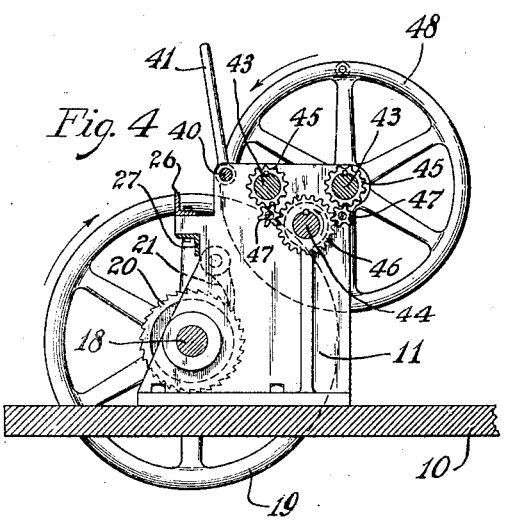
Inventors
Charles C. Cadden.
Frank Slusher.
Benjamin A. Evans.
By Robert M. Pierson
Atty.

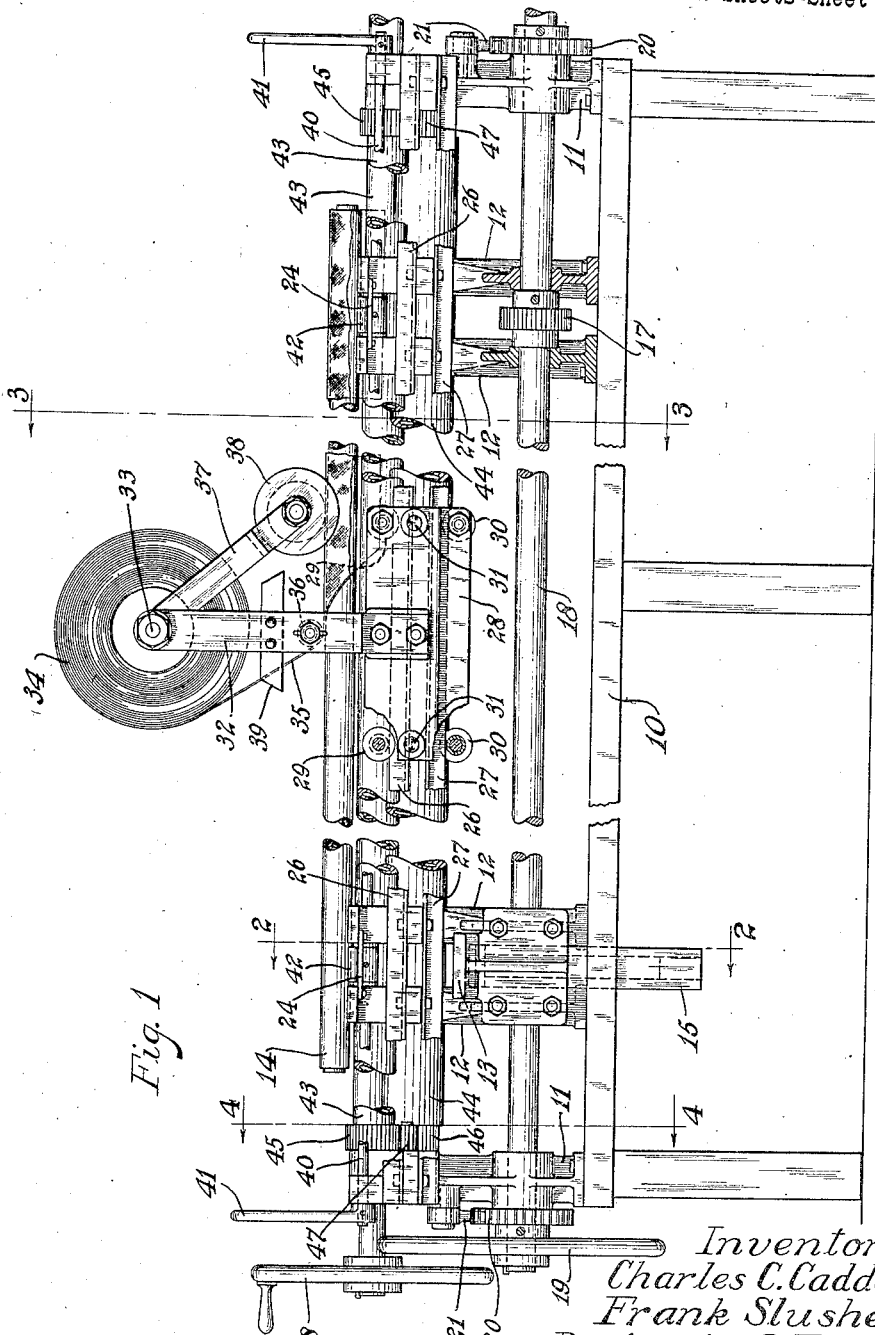

Patented Nov. 22, 1927.

1,649,808

UNITED STATES PATENT OFFICE.

CHARLES C. CADDEN, FRANK SLUSHER, AND BENJAMIN A. EVANS, OF AKRON, OHIO, ASSIGNORS TO THE B. F. GOODRICH COMPANY, OF NEW YORK, N. Y., A CORPORATION OF NEW YORK.

METHOD AND APPARATUS FOR MAKING TUBULAR ARTICLES.

Application filed March 11, 1924. Serial No. 698,452.

This invention relates to the manufacture of tubular articles such as are built upon removable mandrels, and more particularly to fluid conducting hose such as comprises a laminated structure of rubber or rubber with fabric reinforcement.

In the manufacture of hose of the foregoing description, it heretofore has been common practice to lay the raw material flat upon a suitable support, place the mandrel, either bare or with a primary covering thereon, upon one edge of said raw material, and then roll said mandrel over said material to wrap the latter upon itself, at the same time progressively stitching down the material with a hand roller to prevent the entrapping of any air between the plies and to improve adhesion of the same.

It is the chief object of our invention to provide improved, labor-saving apparatus for the manufacture of laminated rubber hose and the like. A more specific object is to provide apparatus adapted to receive a plurality of hose mandrels, deliver them successively to operative position, apply one edge of a cover strip to each, and wrap said strip laterally around the mandrel.

Of the accompanying drawings:

Fig. 1 is a front elevation of apparatus embodying and adapted to carry out our invention in its preferred form, parts being broken away and parts shown in section.

Fig. 2 is a transverse section on line 2—2 of Fig. 1.

Fig. 3 is a section on line 3—3 of Fig. 1.

Fig. 4 is a section on line 4—4 of Fig. 1.

Fig. 5 is a section on the line 5—5 of Fig. 2.

Referring to the drawings 10 is a suitable stand or table upon which is mounted end frames 11, 11, and a plurality of intermediate frames 12, 12, the latter being positioned in pairs. Secured to the front of each pair of frames 12 is a forwardly extending, slightly upwardly inclined bracket 13, the set of brackets being adapted to support a plurality of mandrels 14, 14, (Fig. 2), upon which the primary plies of the hose may have been previously wrapped, and an abutment $12^a$ is formed on the adjacent edge of each of said frames 12 to position the lowermost of said mandrels over respective elevating devices adapted to raise successive mandrels to operative position.

Each elevating device comprises a vertical slide 15, mounted in suitable ways defined by the frames 12 of each pair and their bracket 13, and having its rear face provided with a rack 16 meshed with a pinion 17, the several pinions 17 being secured on a shaft 18 journaled in the frames 11, 12 and having each of its ends, beyond said frames 11, provided with a hand wheel such as is shown at 19, so that it may be manually rotated from either end of the machine. Ratchets 20, 20 secured to said shaft 18 adjacent its respective ends are engaged by pawls 21, 21 pivoted on the frames 11, to prevent recession of the slides 15 while they are being raised.

The top face of each slide 15 is inclined downwardly from its front to its rear edge and is formed with a slot $15^a$, (Fig. 5) disposed transversely with relation to the mandrels 14, in which is pivotally mounted a rearwardly extending, mandrel-retaining latch 22 having its free end notched as at $22^a$, and extending beyond the rear face of said slide. The latch 22 is normally inclined upward at an angle to the top face of the slide, as shown clearly in Fig. 2, thus forming, in effect, an angular notch in which a mandrel rests while the slide is being raised. Said latch 22 is held in its normal upwardly inclined position by a pair of ball detents, 23, 23, (Fig. 5) mounted in the adjacent portion of the slide 15 and engaging respective shallow depressions in its opposite faces, and said latch is adapted to be depressed, against the force of said detents, when the slide 15 is raised to its uppermost position, by a stationary trip 24, mounted on overhanging portions of the frames 12, and to be restored to its normal position as said slide is moved downward. The several latches 22 are thus adapted to permit the adjacent mandrel 14, carried thereon, to roll rearwardly by gravity, onto the frames 12, and into aligned, arcuate notches 25, 25 therein, said mandrel being thereby accurately positioned for subsequent manipulation.

Mounted on opposite sides of suitable supports projecting from the front face of the respective frames 12, between the abutments 12ª and the trips 24, and similar supports on the frames 11, are a pair of parallel, horizontal rails 26, 27, being disposed respectively in upright and inverted position thereon. Mounted upon said rails is a carriage 28 provided with flanged wheels or rollers 29, 29, 30, 30 engaging the respective upper and lower rails, and having a pair of forwardly extending handles 31, 31 by means of which an operator may pull said carriage from one end of the apparatus to the other.

Extending upwardly from the carriage 28 is a vertical support or bracket 32 having its upper end provided with a rearwardly extending spindle 33 adapted rotatably to support a roll 34 of hose-building strip material 35, with the rear margin of the latter directly above a mandrel 14 as the latter rests in the supporting notches 25. Said bracket also carries a vertically adjustable, horizontal, cylindrical work-guiding roller 36 adapted progressively to guide and press the rear margin of the strip 35 onto the mandrel 14, as said strip, started upon the mandrel by hand, is drawn from the roll 34 by the travel of the carriage 28 lengthwise of the apparatus.

Pivotally mounted on the spindle 33 at its inner end is an angular arm 37 having a grooved roller 38 journaled in its free end, said roller being normally in trailing relation to the roller 36 when the carriage 28 is propelled, and adapted to ride upon the mandrel 14 and progressively press the margin of the strip 35 adhesively onto said mandrel to a sufficient lateral width to hold it securely in place. The pivotal feature of the arm 37 permits it to be positioned on either side of the bracket 32 so that it may be placed in trailing position when the carriage is propelled in either direction. A stop or rest 39 secured to the bracket 32 and extending to each side thereof is adapted to engage the arm 37 to hold the roller 38 above the frames 12 when no mandrel is in operative position in the notches 25.

Journaled in the frames 11 and 12 below and to the rear of the notches 25, is a rockshaft 40 provided with hand levers 41, 41 at its respective ends outside said frames 11, and with work-manipulating levers 42, 42 positioned between the frames 12 of each pair, said levers 42 having concave, upper, work-engaging faces. The levers 42 are normally disposed below the mandrel 14 as the latter rests in the notches 25, and are adapted, when either lever 41 is thrown rearwardly, as indicated by broken lines in Fig. 2, to be raised into engagement with the mandrel, to lift the same from its notched supports, and permit it to roll rearwardly by gravity, with the strip 35 thereon, onto mechanism adapted to rotate it upon its own axis to wrap onto it the unattached portion of the strip.

Said mechanism comprises a pair of parallel, spaced-apart shafts 43, 43 and a larger shaft 44 positioned below and intermediate the first mentioned shafts, and slightly separated therefrom, each of said shafts having respective gears 45, 45, 46 (Fig. 4) mounted on each of its end portions, the size of said gears being in direct proportion to the diameter of the respective shafts. Said shafts 43, 44 are journaled in the end frames 11, and pairs of idler pinions 47, 47 mounted on each of said frames and in mesh with the respective gears 45 and with the gear 46, are adapted to drive the three shafts in the same direction and at the same peripheral speed when one of them is rotated, and the rear shaft 43 is provided with a handwheel, such as is shown at 48, at each of its ends, for manually rotating said shafts.

The shaft 44 is supported, at positions intermediate its end journals, upon bearing rollers 49, 49, which are formed with trunions and journaled in notches in the walls of depressions formed in the frames 12 to accommodate said shaft. The shafts 43 are provided, intermediate their end journals, with auxiliary supporting means consisting of sets of rollers 50, 50 journaled on the frames 12 on opposite sides of the shaft 44, in the same manner as the rollers 49, the rigidity of the shafts 43 being such that the rollers 50, although not positioned directly under them, are adapted to prevent them from sagging into contact with the shaft 44. The shafts 43 are spaced at such distance apart as to permit the work to rest upon the shaft 44 throughout the wrapping operating, without exerting great pressure upon the wrapping, so that the latter is wrapped with but little tension, and especially in the first part of the wrapping, although said shafts are so closely spaced as to prevent the work from departing appreciably from parallelism with the shaft 44, so that the latter may act uniformly upon the work throughout its length.

The top faces of the several frames 12, at the rear of the work rotating mechanism, slope sharply downward, as shown at 12ᵇ, and each terminates in a raised abutment or stop 12ᶜ, said slopes and abutments being adapted for the temporary storage of the covered mandrels after their removal from said work-rotating mechanism.

In the operation of our invention, the carriage 28 being at one end of the apparatus, a plurality of mandrels 14, either bare of having a primary covering of sheet rubber or cement, are mounted upon the brackets 13. The handwheel 19 is then rotated clockwise as viewed in Fig. 4, raising the slides 15 and with them one of said mandrels, the latter being released therefrom and permitted to roll by gravity into the supporting notches 25 of the frames 12, when said slides reach the top of their stroke and the mandrel-retaining latches 22 are depressed by the trips 24.

Next the free end of the strip 35 is stuck upon the adjacent end of the mandrel 14. The carriage 28 is then manually propelled lengthwise of the apparatus, causing the strip to be withdrawn from the supply roll 34 and guided by the guide-roller 36 into proper position upon the mandrel 14, and its margin being pressed into adhesive contact with the mandrel by the trailing roller 38. The strip 35 is then severed by hand from the roll 34.

The cover-strip 35 being thus attached along its side margin to the mandrel, the roller 38 is swung over so as to clear the mandrel, and the hand-lever 41 is rocked rearwardly, raising the levers 42, lifting mandrel from the notches 25, and permitting it to roll rearwardly into the work-rotating mechanism comprising the parallel shafts 43, 43 and 44. Rotation of the handwheel 48, counter-clockwise as viewed in Fig. 4, rotates said shafts and the work therein, thereby revolving the mandrel on its own axis and wrapping the unattached portion of the strip 35 laterally thereabout. The covered mandrel is then manually removed from the work-rotating mechanism and permitted to roll down the slopes 12$^b$, successive mandrels stacking themselves against the abutment 12$^c$.

Our apparatus is relatively simple in construction, and may be operated by a single operator. The operation thereof is not laborious, and it is adapted for rapid production. The strips of hose material may be very accurately applied to successive mandrels, and the arrangement of the shafts 43, 44 as described is such that uniformity of wrapping may be obtained.

Modifications may be resorted to without departing from the scope of our invention, and we do not wholly limit our claims to the specific construction shown nor to the exact procedure described.

We claim:

1. Apparatus for making tubular articles, said apparatus comprising means for supporting a mandrel, means adapted to convey a roll of strip material longitudinally of said mandrel, to withdraw material from said roll, and to attach one margin only thereof to said mandrel, means for shifting said mandrel laterally to a wrapping station, and means for rotating said mandrel to wrap the unattached portion of said strip thereon.

2. Apparatus for making tubular articles, said apparatus comprising means for supporting a mandrel, means adapted to convey a roll of strip material longitudinally of said mandrel to withdraw material from said roll and progressively attach one margin only thereof to said mandrel, means for supporting said mandrel as it moves laterally, by gravity, to a wrapping station, and means at said wrapping station for peripherally driving said mandrel to wrap the unattached portion of said strip thereon.

3. Apparatus for making tubular articles, said apparatus comprising means for non-rotatably supporting a cylindrical mandrel, means for progressively attaching one margin only of a strip of material adhesively thereto, means for moving said mandrel laterally out of its aforesaid support, and mandrel rotating means so positioned as to receive said mandrel as it moves therefrom.

4. Apparatus for making tubular articles, said apparatus comprising means for non-rotatably supporting a cylindrical mandrel, means for progressively attaching one margin only of a strip of material adhesively thereto, means for moving said mandrel laterally to a wrapping mechanism, said mechanism comprising a plurality of parallel shafts rotatable in the same direction and adapted to support and peripherally drive said mandrel to wrap the unattached portion of said strip material thereon.

5. In apparatus for making tubular articles, the combination of a mandrel covering device, a storage support for a plurality of mandrels adjacent thereto and in a lower position, elevating mechanism comprising a plurality of slides adapted to engage a mandrel at intervals throughout its length, and means for actuating said slides in unison to raise said mandrel to operative position on the covering device.

6. In apparatus for making tubular articles, the combination of a mandrel covering device, a storage support for a plurality of mandrels adjacent thereto and in a lower position, a plurality of slides adapted to engage a mandrel at spaced-apart intervals, the work-supporting portions of the respective slides including a work-retaining latch, means for actuating said slides in unison to raise the work to operative position, and means for actuating said latches in unison to release the work from said slides.

In witness whereof we have hereunto set our hands this 6th day of March, 1924.

CHARLES C. CADDEN.
FRANK SLUSHER.
BENJAMIN A. EVANS.